US007247688B2

(12) United States Patent
Destarac et al.

(10) Patent No.: US 7,247,688 B2
(45) Date of Patent: Jul. 24, 2007

(54) METHOD FOR SYNTHESIS OF BLOCK POLYMERS BY CONTROLLED FREE RADICAL POLYMERIZATION

(75) Inventors: Mathias Destarac, Paris (FR); Frédéric Leising, Avilly St-Leonard (FR); Yves Gnanou, Talence (FR); Daniel Taton, Camarsac (FR); Alex Dureault, Paris (FR)

(73) Assignee: Rhodia Chimie, Aubervilliers (FR)

( * ) Notice: Subject to any disclaimer, the term of this patent is extended or adjusted under 35 U.S.C. 154(b) by 261 days.

(21) Appl. No.: 10/343,045

(22) PCT Filed: Jul. 20, 2001

(86) PCT No.: PCT/FR01/02374

§ 371 (c)(1),
(2), (4) Date: Jul. 28, 2003

(87) PCT Pub. No.: WO02/10223

PCT Pub. Date: Feb. 7, 2002

(65) Prior Publication Data

US 2004/0059078 A1 Mar. 25, 2004

(30) Foreign Application Priority Data

Jul. 28, 2000 (FR) .................................. 00 09952

(51) Int. Cl.
*C08F 2/38* (2006.01)
*C08F 293/00* (2006.01)
*C08F 230/02* (2006.01)

(52) U.S. Cl. ...................... 526/193; 526/346; 526/347; 525/59; 525/255; 525/267; 525/299

(58) Field of Classification Search ................ 526/193, 526/346, 347; 525/255, 267, 59, 299
See application file for complete search history.

(56) References Cited

U.S. PATENT DOCUMENTS 3,639,370 A 2/1972 Heinz ........................ 260/88.7

FOREIGN PATENT DOCUMENTS

WO WO 00/20465 4/2000

OTHER PUBLICATIONS

Patent Abstracts of Japan, vol. 010, No. 103 (C-340), & JP 60 233112 A (Nov. 19, 1985) abstract.
Database WPI, Derwent Publications Ltd. , AN 1993-096776, XP002154822, & JP 05 039296 A, Feb. 19, 1993 abstract.
Database WPI, Derwent Publications Ltd. , AN 1987-069132, XP002154823 & JP 62 022805 A, Jan. 31, 1987 abstract.
International Search Report.

*Primary Examiner*—Fred Teskin

(57) ABSTRACT

The invention concerns a method for preparing a first generation polymer comprising a step which consists in free radical polymerization of a composition comprising: at least an ethylenically unsaturated monomer, a source of free radicals, at least a dithiophosphoroester compound.

22 Claims, No Drawings

METHOD FOR SYNTHESIS OF BLOCK POLYMERS BY CONTROLLED FREE RADICAL POLYMERIZATION

This application is an application under 35 U.S.C. Section 371 of International Application Number PCT/FR01/02374 filed on Jul. 20, 2001.

The present invention relates to a novel process of free radical polymerisation which provides block polymers, and to the block polymers thus obtained.

Block polymers are commonly prepared by ionic polymerization. This type of polymerization has the drawback of allowing the polymerization only of certain types of apolar monomers, especially styrene and butadiene, and of requiring a particularly pure reaction medium and temperatures often lower than ambient, in order to minimize side reactions, thereby resulting in severe operational constraints.

Free radical polymerization has the advantage of being easy to implement without observing excessive purity conditions, and at temperatures of ambient or above. Until recently, however, there was no free radical polymerization process allowing block polymers to be obtained.

In conventional free radical polymerization, the reactivity of the growing macroradicals is nonselective: the chains undergo irreversible termination by coupling or dismutation. As a consequence, it is very difficult to control the structure of the chains. The possibilities for obtaining functional polymers, telechelic polymers or block copolymers are extremely limited. Recently, a new process of free radical polymerization has been developed: this is "controlled" or "living" free radical polymerization. A number of techniques have been developed in which the polymeric chain ends can be reactivated by virtue of a reversible termination or transfer reaction (dormant species/active species equilibrium).

Controlled free radical polymerization presents the following distinctive aspects:
1. the number of chains is fixed throughout the reaction;
2. the chains all grow at the same rate, which results in:
   a linear increase in molecular masses with conversion,
   a narrowed mass distribution;
3. the average molecular mass is controlled by the molar ratio of monomer to chain precursor;
4. the possibility of preparing block copolymers.

The controlled character is all the more marked given that the rate of reactivation of the chains to radical is very great, ahead of the rate of chain growth (propagation). Cases exist where this is not always true (i.e., the rate of reactivation of the chains to radical is lower than the propagation rate) and conditions 1 and 2 are not observed; nevertheless, it is still possible to prepare block copolymers.

Recently, processes of living free radical polymerization by thermal initiation have been developed. For example, PCT patent applications WO 98/01478 to DuPont de Nemours and WO 99/35178 to Rhodia Chimie describe the use of transfer agents which are reversible by addition-fragmentation, of the RSC=SR' dithioester type, for the synthesis of copolymers possessing controlled architecture. Another family of reversible transfer agents, the xanthates RSC=SOR', were described in patent application WO 98/58974 to Rhodia Chimie as precursors of block copolymers. The control of free radical polymerization by dithiocarbamates $RS(C=S)NR_1R_2$ has also recently been described in the patent applications WO 99/35177 to Rhodia and WO 99/31144 to DuPont de Nemours.

Controlled free radical polymerization possesses an advantage over conventional free radical polymerization when the aim is to prepare chains which are of low molecular weight and are functionalized (reactive telomers). Such polymers are required for specific applications such as, for example, coatings and adhesives.

Thus, when the aim is to synthesize chains grafted with on average 2 functional comonomers, the fraction of chains having one functional site at most becomes great when the average degree of polymerization is less than a threshold value (e.g., 20 or 30). Controlled free radical polymerization makes it possible to reduce or even inhibit the formation of these oligomers to zero or one functional site, which are detrimental to application performance.

In the remainder of the description, the term "polymer", is used to describe homopolymers or copolymers, unless indicated otherwise.

Moreover, a block polymer is understood to be a copolymer comprising at least two successive enchainments of blocks of monomer units of different chemical constitution. The blocks may consist of a homopolyer or of a polymer obtained from a mixture of ethylenically unsaturated monomers. In this case the block may be a random copolymer. The block copolymer may comprise two blocks each composed of random copolymers. In this case, the ethylenically unsaturated monomers are such that the blocks obtained are different in nature. By differences in nature are meant blocks composed of monomers of different types, but also blocks composed of monomers of the same type but in different amounts.

One aim of the present invention is to provide a novel process of free radical polymerization using a novel control agent.

A second aim of the invention is to provide a process of polymerization during which the number average molar masses $M_n$ of the polymers obtained are effectively controlled.

Another aim is to provide a controlled free radical polymerization process for synthesising chain end functionalized polymers.

Another aim is to provide polymers having a low polydispersity index ($M_w/M_n$), i.e., close to 1, $M_w$ being the molecular mass by weight.

All of these aims and others which will appear in the remainder of the description are achieved by the present invention, which provides a process for preparing a first generation functionalized polymer, comprising a step of free radical polymerization of a composition comprising:
  at least one ethylenically unsaturated monomer,
  a source of free radicals, and
  at least one compound (III) of general formula (IIIA), (IIIB) or (IIIC):

(IIIA)

(IIIB)

-continued

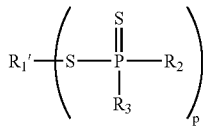
(IIIC)

in which:
R$_1$ and R'$_1$ represent:
an optionally substituted alkyl, acyl, aryl, aralkyl, alkene or alkyne group,
an optionally substituted, aromatic, saturated or unsaturated heterocyclic or carbon ring,
a polymeric chain,
R$_2$, R$_3$ and R'$_2$, which are identical or different, represent:
a hydrogen atom,
—S—R$_1$,
an optionally substituted alkyl, acyl, aryl, aralkyl, alkene or alkyne radical,
an optionally substituted, aromatic, saturated or unsaturated heterocyclic or carbon ring,
R$_2$ and R$_3$, or R'$_2$ and R$_3$, together, represent the atoms needed to form an optionally substituted, aromatic, saturated or unsaturated heterocyclic or carbon ring, and
p is between 2 and 10.

The compound (III) useful in the process of the invention comprises a dithiophosphoric ester function. The pentavalence of the phosphorus allows the number and, consequently, the nature of the substituents to be augmented.

It may be noted that, when the radicals R$_2$ and/or R$_3$ are —S—R$_1$, one, two or three active sites are present in the compound (III). When R$_1$ and R'$_1$ are a polymeric chain, this polymeric chain may result from an ionic or free radical polymerization or from a polycondensation.

The groups R$_1$, R$_1$', R$_2$ and R$_2$' and R$_3$, when they are substituted, may be substituted by substituted phenyl groups, substituted aromatic groups, saturated or unsaturated carbon rings, saturated or unsaturated heterocycles, or by the following groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR$_2$), halogen, perfluoroalkyl C$_n$F$_{2n+1}$, allyl, epoxy, alkoxy (—OR), S-alkyl, S-aryl, groups exhibiting an ionic or hydrophilic character, such as alkali metal salts of carboxylic acids, alkali metal salts of sulfonic acid, polyalkylene oxide chains (PEO, POP), cationic substituents (quaternary ammonium salts), R representing an alkyl or aryl group or a polymeric chain.

In one particular embodiment, R$_1$ and R$_1$' are substituted or unsubstituted, preferably substituted, alkyl groups.

The compounds (III) useful in the present invention are, for example, compounds III in which R$_1$ or R$_1$' is selected from:
CH$_2$C$_6$H$_5$
CH(CH$_3$)(CO$_2$Et)
CH(CH$_3$)(C$_6$H$_5$)
CH(CO$_2$Et)$_2$
C(CH$_3$)(CO$_2$Et)(S—C$_6$H$_5$)
C(CH$_3$)$_2$(C$_6$H$_5$)
C(CH$_3$)$_2$CN

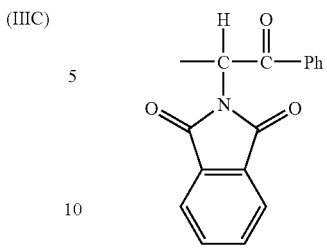

In which Et represents an ethyl group and Ph represents a phenyl group.

The compounds of formulae (IIIA), (IIIB) and (IIIC) are readily available. They may in particular be obtained by reacting P$_4$S$_{10}$, K$_2$CO$_3$ and a halogenated derivative (Nizamov et al. *Phosphorous Sulfur and Silicon,* Vol. 132, 85-100 (1998)). Another access route consists in reacting an alkali metal salt of a dithio-phosphonic acid with a halogenated derivative (Mastryukova et al. *Bull Acad. Sci. USSR. Div. Chem. Sci* (Engl Transl), Vol. 27, 1917 (1978)).

In all cases the process of the invention is implemented in the presence of a source of free radicals; however, for certain monomers, such as styrene, the free radicals which allow the polymerization to be initiated may be generated by the ethylenically unsaturated monomer itself at sufficiently high temperatures, generally greater than 100° C. In this case it is not necessary to add a source of additional free radicals.

The source of free radicals useful in the process of the present invention is generally a free radical polymerization initiator. The free radical polymerization initiator may be selected from the initiators conventionally used in free radical polymerization. This may be, for example, one of the following initiators:

hydrogen peroxides such as: tertiary butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutarate, lauroyl peroxide, t-amyl peroxypivalate, t-butyl peroxypivalate, dicumyl peroxide, benzoyl peroxide, potassium persulfate, ammonium persulfate;

azo compounds such as: 2-2'-azobis(isobutyronitrile), 2,2'-azobis(2-butanenitrile), 4,4'-azobis(4-pentanoic acid), 1,1'-azobis (cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis (2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide) dihydrate, redox systems comprising combinations such as:
mixtures of hydrogen peroxide, alkyl peroxide, peresters, percarbonates and the like and of any one of iron salts, titanous salts, zinc formaldehyde-sulfoxylate or sodium formaldehyde-sulfoxylate, and reducing sugars;
alkali metal or ammonium persulfates, perborate or perchlorate in combination with an alkali metal disulfite, such as sodium metabisulfite, and reducing sugars;

alkali metal persulfate in combination with an arylphosphinic acid, such as benzenephosphonic acid and other similar acids, and reducing sugars.

In accordance with one embodiment, the amount of initiator to be used is determined such that the mount of radicals generated is not more than 50 mol % with respect to the amount of compound (III), preferably not more than 20 mol %.

The ethylenically unsaturated monomers useful in the process of the present invention are all monomers which polymerize in the presence of the compound (III) to give active polymeric chains.

These ethylenically unsaturated monomers are for example styrene and styrene derivatives such as alpha-methylstyrene or vinyltoluene, vinyl esters of carboxylic acid, such as vinyl acetate, vinyl Versatate®, vinyl propionate, vinyl halides, ethylenically unsaturated monocarboxylic and dicarboxylic acids, such as acrylic acid, methacrylic acid, itaconic acid, maleic acid, fumaric acid, and the monoalkyl esters of the dicarboxylic acids of the type mentioned with alkanols having preferably from 1 to 4 carbon atoms, and their N-substituted derivatives, amides of unsaturated carboxylic acids, such as acrylamide, methacrylamide, N-methylolacrylamide or -methacrylamide, N-alkylacrylamides, ethylenic monomers containing a sulfonic acid group and its alkali metal or ammonium salts, for example vinylsulfonic acid, vinylbenzene-sulfonic acid, alpha-acrylamidomethylpropane-sulfonic acid, 2-sulfoethylene methacrylate, amides of vinylamine, particularly vinyl-formamide or vinylacetamide, unsaturated ethylenic monomers containing a secondary, tertiary or quaternary amino group or a heterocyclic group containing nitrogen, such as, for example, vinylpyridines, vinyl-imidazole, aminoalkyl(meth)acrylates and aminoalkyl(meth)acrylamides, such as dimethylaminoethyl acrylate or methacrylate, ditertbutylaminoethyl acrylate or methacrylate, dimethylaminomethylacrylamide or -methacrylamide, or zwitterionic monomers such as, for example, sulfopropyl (dimethyl)-aminopropyl acrylate, dienes, for example butadiene, chloroprene, (meth)acrylic esters, vinyl nitriles.

Vinylphosphonic acid and its derivatives.

By (meth)acrylic esters are meant the esters of acrylic acid and of methacrylic acid with hydrogenated or fluorinated $C_1$-$C_{12}$, preferably $C_1$-$C_8$, alcohols. Among the compounds of this type mention may be made of: methyl acrylate, ethyl acrylate, propyl acrylate, n-butyl acrylate, isobutyl acrylate, 2-exhylhexyl acrylate, t-butyl acrylate, methyl methacrylate, ethyl methacrylate, n-butyl methacrylate, isobutyl methacrylate.

The vinyl nitriles include more particularly those having from 3 to 12 carbon atoms, such as acrylonitrile and methacrylonitrile in particular.

For the preparation of polyvinylamine blocks it is preferred to use as ethylenically unsaturated monomers the amides of vinylamine, for example, vinylformamide or vinylacetamide. The polymer obtained is then hydrolysed at acidic or basic pH.

For the preparation of polyvinyl alcohol blocks it is preferred to use as ethylenically unsaturated monomers the vinyl esters of carboxylic acid, such as vinyl acetate, for example. The polymer obtained is then hydrolysed at acidic or basic pH.

The types and amounts of polymerizable monomers employed in accordance with the present invention vary depending on the particular end use for which the polymer is intended. These variations are well known and can be readily determined by the skilled worker.

These ethylenically unsaturated monomers may be used alone or in mixtures.

In accordance with one specific embodiment, in the process for preparing a first generation polymer, the ethylenically unsaturated monomer corresponds to the formula $CXX'(=CV-CV')_b=CH_2$ and, when a compound (III) of formula (IIIA) is used, the first generation polymer obtained corresponds to the formula

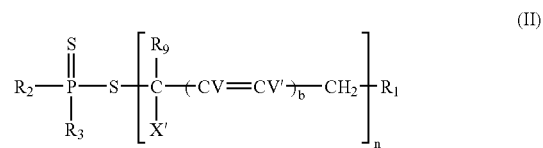

(II)

in which $R_1$ represent:

an optionally substituted alkyl, acyl, aryl, alkene or alkyne group, an optionally substituted, aromatic, saturated or unsaturated heterocyclic or carbon ring, a polymeric chain, $R_2$ and $R_3$, which are identical or different, represent:

a hydrogen atom,

—S—$R_1$ or —S—[CXX'—(CV=CV')$_b$—CH$_2$]$_n$—$R_1$, an optionally substituted alkyl, acyl, aryl, aralkyl, alkene or alkyne radical, an optionally substituted, aromatic, saturated or unsaturated heterocyclic or carbon ring, $R_2$ and $R_3$, together, represent the atoms needed to form an optionally substituted, aromatic, saturated or unsaturated heterocyclic or carbon ring, n is greater than or equal to 1, preferably greater than 6, V and V', which are identical or different, represent: H, an alkyl group or a halogen, X and X', which are identical or different, represent H, a halogen or a group $R_4$, $OR_4$, $O_2COR_4$, NHCOH, OH, $NH_2$, $NHR_4$, $N(R_4)_2$, $(R_4)_2N^+O^-$, $NHCOR_4$, $CO_2H$, $CO_2R_4$, CN, $CONH_2$, $CONHR_4$ or $CON(R_4)_2$, in which $R_4$ is selected from alkyl, aryl, aralkyl, alkaryl, alkene or organosilyl groups which are optionally perfluorinated and optionally substituted by one or more carboxy, epoxy, hydroxyl, alkoxy, amino, halogen or sulfonic groups, and b is 0 or 1.

The process above is described starting from a compound of formula (IIIA), although this teaching is directly applicable to the compounds of formulae (IIIB) or (IIIC).

The polymerization may be conducted in bulk, in solution; in emulsion, in dispersion or in suspension. It is preferably implemented in solution or in emulsion.

The process is preferably implemented semi-continuously.

The temperature may vary between the ambient temperature and 150° C. in accordance with the nature of the monomers used.

In general, during the polymerization, the instantaneous polymer content with respect to the instantaneous amount of monomer and polymer, is between 50 and 99% by weight, preferably between 75 and 99%, more preferably still between 90 and 99%. This content is maintained, in a known way, by controlling the temperature, the rate of addition of the reactants and, where appropriate, the polymerization initiator.

The process is generally implemented in the absence of a UV source, by thermal initiation.

The process of the invention can be implemented starting from a mixture of ethylenically unsaturated monomers. In that case a random first generation polymer is obtained. By selecting monomers of particular types, for example, hydrophilic monomers and hydrophobic monomers, and the amount of each of these monomers in the block, a block is obtained which has particular properties. This procedure is particularly advantageous when the first generation polymer thus obtained is an intermediate in the preparation of a block copolymer.

The present invention likewise provides a process for preparing an Nth generation block copolymer by free radical polymerization, N being greater than or equal to 2, which comprises:
- a first step of free radical polymerization as described above, to form the first generation polymer, followed by
- N-1 steps of free radical polymerization, each of these steps being implemented starting from a composition comprising:
  - at least one ethylenically unsaturated monomer,
  - a source of free radicals, and the block polymer obtained in the preceding step of free radical polymerization, the ethylenically unsaturated monomer or monomers being such that the block formed in this step is different in nature to the block formed in the preceding step.

For example, a second generation block copolymer can be obtained by a process which comprises the free radical polymerization of a composition comprising:
- at least one ethylenically unsaturated monomer,
- a source of free radicals, and
- the first generation polymer obtained by free radical polymerization of the composition comprising the compound (III) and ethylenically unsaturated monomer, the block thus obtained being different in nature to the first generation polymer.

In accordance with one embodiment of the invention, (1) a first generation polymer is synthesized starting from a composition comprising one or more ethylenically unsaturated monomers, a source of free radicals and a compound of formula (IIIA), (IIIB) or (IIIC), and then (2) the first generation polymer obtained in step (1) is used to prepare a diblock (second generation) copolymer by contacting this first generation polymer with one or more ethylenically unsaturated monomers and a source of free radicals, the block obtained in step (2) being different in nature to the first generation polymer of step (1).

This step (2) may be repeated with further monomers and the diblock copolymer obtained in order to synthesize a new block and to obtain a triblock copolymer.

Thus it is possible to repeat as many times as necessary the step of polymerization starting from a block copolymer to give a copolymer having an additional block.

The process of the invention therefore makes it possible to obtain a diblock copolymer of general formula (I):

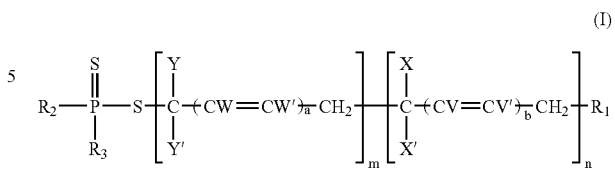

starting from a composition comprising:
an ethylenically unsaturated monomer of formula CYY' (CW=CW')$_a$=CH$_2$,
a first generation polymer of general formula (II):

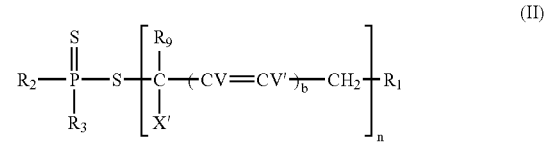

in which
$R_1$ represent:
an optionally substituted alkyl, acyl, aryl, alkene or alkyne group,
an optionally substituted, aromatic, saturated or unsaturated heterocyclic or carbon ring,
a polymeric chain,
$R_2$ and $R_3$, which are identical or different, represent:
a hydrogen atom,
—S—R$_1$ or —S—[CXX'—(CV=CV')$_b$—CH$_2$)$_n$—R$_1$,
an optionally substituted alkyl, acyl, aryl, aralkyl, alkene or alkyne radical,
an optionally substituted, aromatic, saturated or unsaturated heterocyclic or carbon ring,
$R_2$ and $R_3$, together, represent the atoms needed to form an optionally substituted, aromatic, saturated or unsaturated heterocyclic or carbon ring,
n and m, which are identical or different, are greater than or equal to 1,
V, V', W and W', which are identical or different, represent: H, an alkyl group or a halogen,
X, X', Y and Y', which are identical or different, represent H, a halogen or a group $R_4$, $OR_4$, $O_2COR_4$, NHCOH, OH, NH$_2$, NHR$_4$, N(R$_4$)$_2$, (R$_4$)$_2$N$^+$O$^-$, NHCOR$_4$, CO$_2$H, CO$_2$R$_4$, CN, CONH$_2$, CONHR$_4$ or CON(R$_4$)$_2$, in which R$_4$ is selected from alkyl, aryl, aralkyl, alkaryl, alkene or organosilyl groups which are optionally perfluorinated and optionally substituted by one or more carboxy, epoxy, hydroxyl, alkoxy, amino, halogen or sulfonic groups, and
a and b, which are identical or different, are 0 or 1.

The ethylenically unsaturated monomers which are useful are those described above.

The above process is described starting from a polymer (II) obtained from a compound of formula (IIIA), but this teaching is directly applicable to the polymers obtained starting from compounds (IIIB) and (IIIC).

The compounds of formula (IIIA) when $R_2$ and/or $R_3$ represent —S—R$_1$, (IIIB) and (IIIC) are particularly advantageous since they allow a polymeric chain to be grown on at least two active sites. With this type of compound it is possible to save on polymerization steps to obtain a copolymer having n blocks. Thus, if p is 2 in the formula (IIIB) or (IIIC), the first block is obtained by polymerizing a monomer M1 in the presence of the compound of formula (IIIB) or (IIIC). This first block may subsequently grow at each of its ends by polymerization of a second monomer M2. A triblock copolymer is obtained; this triblock copolymer may itself grow at each of its ends by polymerization of a third monomer M3. In this way a "pentablock" copolymer is obtained in only three steps. If p is greater than 2, the process makes it possible to obtain homopolymers or copolymers having blocks whose structure is "multiarm" or star-shaped.

In accordance with this process for preparing block polymers, when it is desired to obtain polymers having blocks which are homogeneous and do not have a composition gradient, and if all the successive polymerizations are conducted in the same reactor, it is essential that all of the monomers used in one step have been consumed before the polymerization of the following step begins, i.e. before the next monomers are introduced.

When the desire is to obtain a random block, the polymerization step is implemented with a composition containing a mixture of ethylenically unsaturated monomers.

The present invention further provides first generation polymers and block polymers obtainable by any one of the processes of the invention. These polymers have a low polydispersity index and a controlled molecular mass. The polydispersity index is not more than 2, preferably not more than 1.5.

In accordance with one specific embodiment, the block polymers comprise at least two polymeric blocks selected from the following combinations:
polystyrene/polymethyl acrylate,
polystyrene/polyethyl acrylate,
polystyrene/poly-tert-butyl acrylate,
polyethyl acrylate/polyvinyl acetate,
polybutyl acrylate/polyvinyl acetate,
poly-tert-butyl acrylate/polyvinyl acetate.

One of the blocks may also be composed of a random copolymer obtained starting from a mixture of ethylenically unsaturated monomers.

In accordance with one specific embodiment, the reactive ends of the block polymer may be cleaved to form a polymer whose ends are thiols or hydrogen atoms. These modifications may be implemented by reduction and/or hydrolysis.

The following examples illustrate the invention without, however, limiting its scope.

EXAMPLES

Example 1

Synthesis of Precursor Compounds of Formula (IIIA):

Synthesis of a Tetrathiophosphate of Formula (IIIA1)

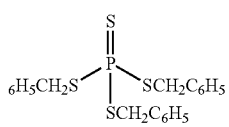

1 eq of tetraphosphorus decasulfide (P4S10) is first treated with 6 eq of potassium carbonate in acetonitrile at 100° C. for 30 minutes. After cooling to ambient temperature, 12 eq of benzyl chloride are added and the mixture is refluxed for 2 hours. After the byproducts of the reaction have been filtered and the filtrate washed, the product is purified by chromatography on neutral alumina gel (eluent: toluene). The yield is 15%. $^{13}$C NMR (CDCl$_3$): 128-130 ppm: phenyl group; 44 ppm: CH$_2$ Ph.

Example 2

Synthesis of Homopolymers of Formula (I)

In the examples given below, the polymerization reactions are carried out in Schlenk-type apparatus. In each case the mixture present within the reactor is connected to a vacuum ramp, immersed in liquid nitrogen, followed by three cycles of freezing-vacuum-return to ambient temperature in order to degas the mixture. The reactor is subsequently left under static vacuum at the appropriate temperature. Kinetic monitoring is carried out by taking samples of the reaction medium over time, under a stream of nitrogen. After each sampling, a further degassing operation is carried out as described above. The monomer conversion is determined by gravimetry following evaporation of the residual monomer under vacuum.

The (co)polymers are analyzed by steric exclusion chromatography (SEC) using THF as elution solvent; the molar masses are expressed in polystyrene equivalents (g.mol$^{-1}$).

These examples demonstrate that the free radical polymerization is controlled, employing the compound of formula (IIIA1). Polymerization control is demonstrated in particular through the values of the polymolecularity indices, $I_p=M_w/M_n$, which are less than 1.5. Furthermore, the experimental values of the number average molar masses ($M_n$) and the peak masses ($M_p$) increase linearly with the monomer conversion.

Example 2.1

Homopolystyrene Obtained Starting From Compound (IIIA1)

0.183 g (4.24×10$^{-4}$ mol) of compound of general formula (IIIA1) and 4.54 g (4.37×10$^{-2}$ mol) of styrene are mixed. After degassing, the solution is heated to 110° C. The change in molar mass observed at the summit of the peak $M_p$ in the —SEC chromatogram is reported in the table below. It is also observed that, over the entire conversion range, the polydispersity index is less than 1.4.

| Conversion (%) | $M_p$ (g/mol) |
|---|---|
| 10 | 4 150 |
| 16 | 6 700 |
| 35 | 24 200 |
| 45 | 29 400 |
| 51 | 34 050 |
| 61 | 43 900 |

Example 2.2

Poly(methyl styrene-b-acrylate) Diblock copolymer starting from a homostyrene

A solution is prepared from:
3 g of methyl acrylate,
1 g of homopolystyrene precursor of molar mass equal to $M_p$=40 000 g.mol$^{-1}$ ($I_p$=1.3) prepared according to the procedure of Example 2.1, and 7 mg of AIBN (azobisisobutyronitrile).

This solution is heated to 60° C. after the degassing operations. The polymerization lasts 45 minutes, at the end of which time the residual monomer is evaporated. The results are as follows: Number average molar mass, $M_p=64\,000$ g.mol$^{-1}$. Polymolecularity index $I_p=1.3$.

This example shows that the homostyrene of Example 2.1 exhibits active ends, since an increase is observed in the values of Mn by addition of methyl acrylate, and the maintenance of a low polydispersity index.

What is claimed is:

1. A process for preparing a first generation polymer, comprising the step of free radical polymerization of a composition comprising:
   at least one ethylenically unsaturated monomer,
   a source of free radicals, and
   at least one compound (III) of general formula (IIIA):

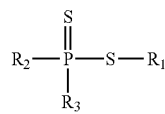
(IIIA)

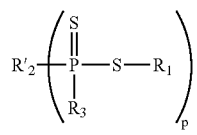
(IIIB)

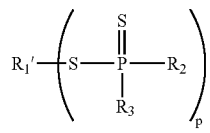
(IIIC)

wherein:
R$_1$ represents:
   an optionally substituted alkyl, acyl, aryl, aralkyl, alkene or alkyne group,
   an optionally substituted, aromatic, saturated or unsaturated heterocyclic or carbon ring,
   a polymeric chain,
R$_2$, and R$_3$, which are identical or different, represent:
   a hydrogen atom,
   —S—R$_1$,
   an optionally substituted alkyl, acyl, aryl, aralkyl, alkene or alkyne radical,
   an optionally substituted, aromatic, saturated or unsaturated heterocyclic or carbon ring,
   R$_2$ and R$_3$, together, represent the atoms needed to form an optionally substituted, aromatic, saturated or unsaturated heterocyclic or carbon ring,
wherein the ethylenically unsaturated monomer corresponds to the formula CXX' (=CV-CV')$_b$=CH$_2$ and the first generation polymer obtained corresponds to the formula

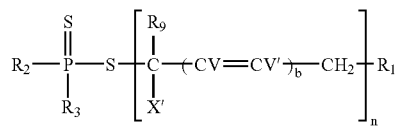
(II)

wherein:
R$_1$ represent:
   an optionally substituted alkyl, acyl, aryl, aralkyl, alkene or alkyne group,
   an optionally substituted, aromatic, saturated or unsaturated heterocyclic or carbon ring,
   a polymeric chain,
R$_2$ and R$_3$, which are identical or different, represent:
   a hydrogen atom,
   —S—R$_1$ or —S—[CXX'—(CV=CV')$_b$—CH$_2$]$_n$—R$_1$,
   an optionally substituted alkyl, acyl, aryl, aralkyl, alkene or alkyne radical,
   an optionally substituted, aromatic, saturated or unsaturated heterocyclic or carbon ring,
   R$_2$ and R$_3$, together, represent the atoms needed to form an optionally substituted, aromatic, saturated or unsaturated heterocyclic or carbon ring,
n is greater than or equal to 1,
V and V', which are identical or different, represent: a hydrogen atom, an alkyl group or a halogen,
X and X', which are identical or different, represent H, a halogen or a group R$_4$, OR$_4$, O$_2$COR$_4$, NHCOH, OH, NH$_2$, NHR$_4$, N(R$_4$)$_2$, (R$_4$)$_2$N$^+$O$^-$, NHCOR$_4$, CO$_2$H, CO$_2$R$_4$, CN, CONH$_2$, CONHR$_4$ or CON(R$_4$)$_2$, wherein R$_4$ are alkyl, aryl, aralkyl, alkaryl, alkene or organosilyl groups which are optionally perfluorinated and optionally substituted by one or more carboxy, epoxy, hydroxyl, alkoxy, amino, halogen or sulfonic groups, and
b is 0 or 1.

2. A process for preparing a second generation block copolymer by free radical polymerization, comprising the step of carrying out a free radical polymerization on a composition comprising:
   an ethylenically unsaturated monomer of formula CYY' (CW=CW')$_n$=CH$_2$,
   a first generation polymer of general formula (II):

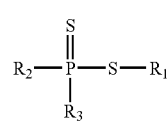
(IIIA)

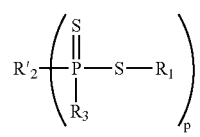
(IIIB)

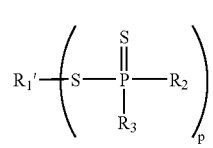
(IIIC)

wherein:
R$_1$ represent:
   an optionally substituted alkyl, acyl, aryl, aralkyl, alkene or alkyne group,
   an optionally substituted, aromatic, saturated or unsaturated heterocyclic or carbon ring,
   a polymeric chain, R₂ and R₃, which are identical or different, represent:
a hydrogen atom,
—S—R₁ or —S—[CXX'—(CV=CV')ᵦ—CH₂]ₙ—R₁,
an optionally substituted alkyl, acyl, aryl, aralkyl, alkene or alkyne radical,
an optionally substituted, aromatic, saturated or unsaturated heterocyclic or carbon ring,
R₂ and R₃, together, represent the atoms needed to form an optionally substituted, aromatic, saturated or unsaturated heterocyclic or carbon ring,
n and m, which are identical or different, are greater than or equal to 1,
V, V', W and W', which are identical or different, represent: H, an alkyl group or a halogen,
X, X', Y and Y', which are identical or different, represent H, a halogen or a group R₄, OR₄, O₂COR₄, NHCOH, OH, NH₂, NHR₄, N(R₄)₂, (R₄)₂N⁺O⁻, NHCOR₄, CO₂H, CO₂R₄, CN, CONH₂, CONHR₄ or CON(R₄)₂, in which R₄ is selected from alkyl, aryl, aralkyl, alkaryl, alkene or organosilyl groups which are optionally perfluorinated and optionally substituted by one or more carboxy, epoxy, hydroxyl, alkoxy, amino, halogen or sulfonic groups, and
a and b, which are identical or different, are 0 or 1,
the second generation block copolymer being of formula (I):

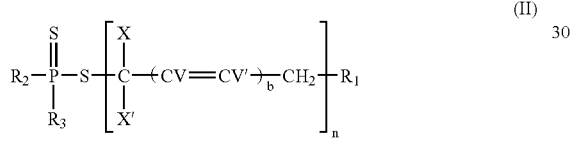

wherein R1, R2, R3, X, X', W, W', V and V" have the meaning given above.

3. The process as claimed in claim 1, wherein the ethylenically unsaturated monomer is styrene, or styrene derivatives, dienes, (meth)acrylic esters, vinyl nitriles or vinyl esters.

4. The process as claimed in claim 2, wherein the ethylenically unsaturated monomer is styrene, or styrene derivatives, dienes, (meth)acrylic esters, vinyl nitriles or vinyl esters.

5. A polymer made by the process as defined in claim 1.

6. A polymer made by the process as defined in claim 2.

7. The polymer as claimed in claim 5, having a polydispersity index of not more than 2.

8. The polymer as claimed in claim 5, having at least two polymeric blocks.

9. The block polymer as claimed in claim 8, wherein the two blocks are:
polystyrene/polymethyl acrylate,
polystyrene/polyethyl acrylate,
polystyrene/poly-tert-butyl acrylate,
polyethyl acrylate/polyvinyl acetate,
polybutyl acrylate/polyvinyl acetate,
polyethyl acrylate/poly-tert-butyl acrylate
poly-tert-butyl acrylate/polyvinyl acetate,
polyethyl acrylate/polybutyl acrylate,
polybutyl acrylate/polyvinyl alcohol, or
polyacrylic acid/polyvinyl alcohol.

10. The polymer as claimed in claim 8, wherein at least one of the blocks is a random polymer obtained starting from a mixture of ethylenically unsaturated monomers.

11. The process as claimed in claim 1, wherein n is greater than 6.

12. A process for preparing a first generation polymer, comprising the step of free radical polymerization of a composition comprising:
at least one ethylenically unsaturated monomer,
a source of free radicals, and
at least one compound (III) of general formula (IIIA), (IIIB) or (IIIC):

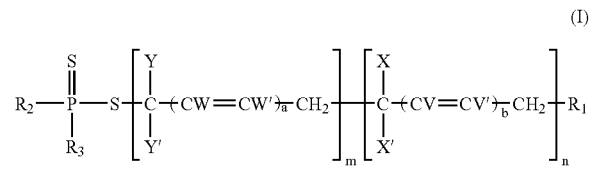

wherein:
R₁ and R'₁ represent:
an optionally substituted alkyl, acyl, aryl, aralkyl or alkyne group,
an optionally substituted, aromatic, saturated or unsaturated heterocyclic or carbon ring,
a polymeric chain,
R₂, R₃ and R'₂, which are identical or different, represent:
a hydrogen atom,
—S—R₁,
an optionally substituted alkyl, acyl, aryl, aralkyl, alkene or alkyne radical,
an optionally substituted, aromatic, saturated or unsaturated heterocyclic or carbon ring,
R₂ and R₃, or R'₂ and R₃, together, represent the atoms needed to form an optionally substituted, aromatic, saturated or unsaturated heterocyclic or carbon ring, and
p is between 2 and 10.

13. A process for preparing an Nth generation block copolymer by free radical polymerization, N being greater than or equal to 2, said process comprising:
a first step of free radical polymerization to form a first generation polymer starting from a composition comprising:
at least one ethylenically unsaturated monomer,
a source of free radicals, and
at least one compound (III) of general formula (IIIA), (IIIB) or (IIIC):

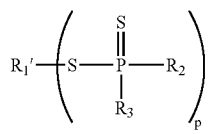

wherein:

$R_1$ and $R'_1$ represent:
- an optionally substituted alkyl, acyl, aryl, aralkyl or alkyne group,
- an optionally substituted, aromatic, saturated or unsaturated heterocyclic or carbon ring,
- a polymeric chain, $R_2$, $R_3$ and $R'_2$, which are identical or different, represent:
- a hydrogen atom,
- —S—$R_1$,
- an optionally substituted alkyl, acyl, aryl, aralkyl, alkene or alkyne radical,
- an optionally substituted, aromatic, saturated or unsaturated heterocyclic or carbon ring,
- $R_2$ and $R_3$, or $R'_2$ and $R_3$, together, represent the atoms needed to form an optionally substituted, aromatic, saturated or unsaturated heterocyclic or carbon ring, and p is between 2 and 10, followed by N-1 steps of free radical polymerization, each of these steps being implemented starting from a composition comprising:

at least one ethylenically unsaturated monomer, a source of free radicals, and the block polymer obtained in the preceding step of polymerization, the ethylenically unsaturated monomer or monomers being such that the block formed in this step is different in nature to the block formed in the preceding step.

14. The process as claimed in claim 13, wherein N equals 2.

15. The process as claimed in claim 12, wherein the ethylenically unsaturated monomer is styrene, or styrene derivatives, dienes, (meth)acrylic esters, vinyl nitriles or vinyl esters.

16. The process as claimed in claim 13, wherein the ethylenically unsaturated monomer is styrene, or styrene derivatives, dienes, (meth)acrylic esters, vinyl nitriles or vinyl esters.

17. A polymer made by the process as defined in claim 12.

18. A polymer made by the process as defined in claim 13.

19. The polymer as claimed in claim 17, having a polydispersity index of not more than 2.

20. The polymer as claimed in claim 18, having at least two polymeric blocks.

21. The polymer as claimed in claim 20, wherein the two blocks are:
- polystyrene/polymethyl acrylate,
- polystyrene/polyethyl acrylate,
- polystyrene/poly-tert-butyl acrylate,
- polyethyl acrylate/polyvinyl acetate,
- polybutyl acrylate/polyvinyl acetate,
- polyethyl acrylate/poly-tert-butyl acrylate
- poly-tert-butyl acrylate/polyvinyl acetate,
- polyethyl acrylate/polybutyl acrylate,
- polybutyl acrylate/polyvinyl alcohol, or
- polyacrylic acid/polyvinyl alcohol.

22. The polymer as claimed in claim 18, wherein at least one of the blocks is a random polymer obtained starting from a mixture of ethylenically unsaturated monomers.

* * * * *